J. F. HARDEN.
CULTIVATOR.
APPLICATION FILED NOV. 18, 1919.
1,415,637.
Patented May 9, 1922.
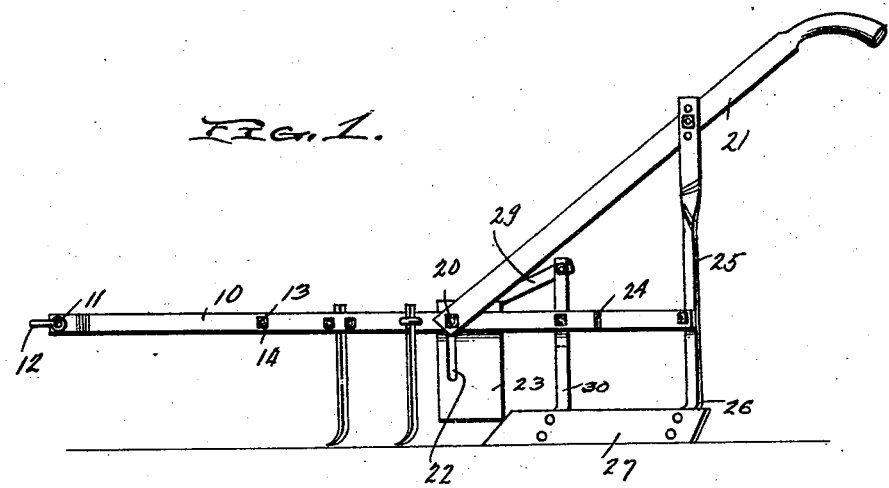
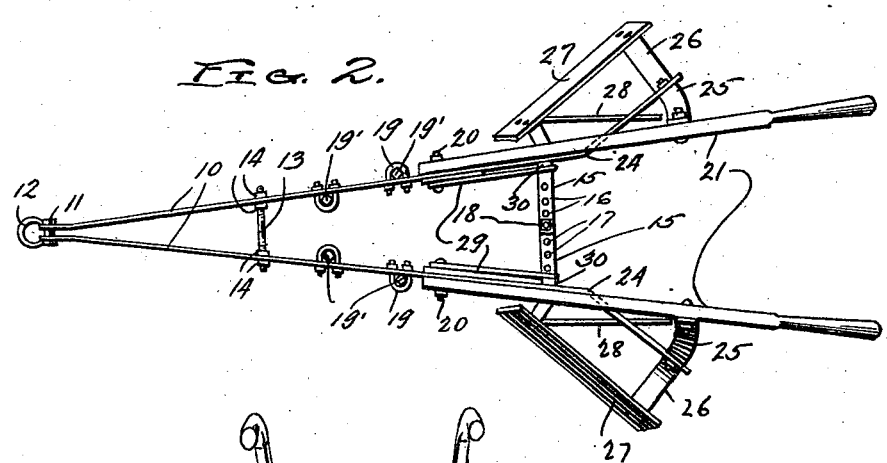
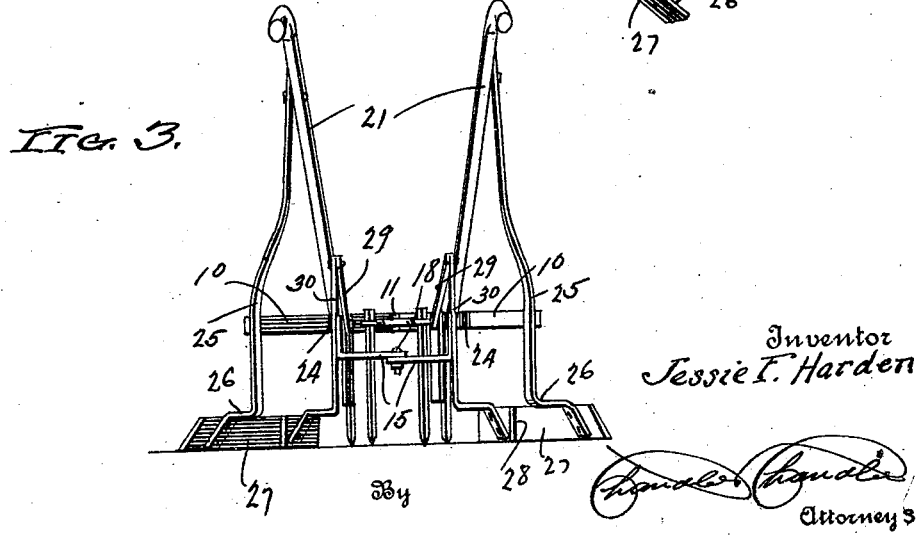
Inventor
Jessie F. Harden
By
Attorneys

UNITED STATES PATENT OFFICE.

JESSIE F. HARDEN, OF BRUNDIDGE, ALABAMA.

CULTIVATOR.

1,415,637.   Specification of Letters Patent.   Patented May 9, 1922.

Application filed November 18, 1919. Serial No. 338,821.

*To all whom it may concern:*

Be it known that I, JESSIE F. HARDEN, a citizen of the United States, residing at Brundidge, in the county of Pike, State of Alabama, have invented certain new and useful Improvements in Cultivators; and I do hereby declare the following to be a full, clear, and exact description of the invention, such as will enable others skilled in the art to which it appertains to make and use the same.

My invention is an improvement in cultivators, and relates more especially to that particular type employed in the cultivation of growing plants by straddling the row so that the attachments or implements for working the soil will operate at both sides of the growing plants.

The principal objects of my invention are to provide a cultivator of this general character which is light in construction consistent with the work it accomplishes, is of light draft and easily handled, may be readily adjusted to suit different conditions with respect to the plants and bed to be cultivated, and in use will operate on the soil at both sides of a row of growing plants by harrowing close up to said plants, plowing or scraping the surface of the soil in and beyond the path of travel of the harrow-teeth, and also shape the bed with respect to the row of plants, all in a thorough and effective manner.

With these principal objects in view my invention consists of a cultivator comprising a frame provided with guiding handles, harrow-teeth depending from the forward portion of said frame, scraper blades attached to the rear end of the frame to follow the harrow-teeth, and spaced apart longitudinal plates which assist in guiding the cultivator over the row of growing plants and further cultivate the latter; together with means for adjusting the several parts, and means for limiting the depth of cut of the blades; all as hereinafter fully described and more particularly set forth in the appended claims.

In the drawings:—

Fig. 1 is a side elevation of a cultivator constructed in accordance with my invention.

Fig. 2 is a plan view thereof, and

Fig. 3 is a rear end elevation.

As it is the main purpose of my invention to provide a machine adapted for the cultivation of gardens or fields in which are grown such plants as peanuts, cotton, vegetables, &c., I have arranged the implements to straddle a row of small growing plants to work the soil at either side without injuring the same, and have also contemplated a size of machine that will require but a single draft-animal to draw it and one man to operate it; and though in the drawings I have shown the preferred embodiment of my invention it will be understood that obvious modifications or changes may be made in the details of construction within the spirit and scope of my claims.

In carrying out my present invention I provide a suitable frame consisting of two side pieces 10, 10, connected at their forward ends by a transverse bolt 11 so that the rear ends may be separated or spread apart to a more or less extent to vary the relative working positions of the implements, hereinafter described, carried thereby; said side pieces being further connected to increase the rigidity of the frame by means of a transverse rod 13 near their forward ends and an interposed adjustable brace 16 near their rear ends. The connecting rod 13 is threaded at both ends to receive nuts 14 at both sides of the two side pieces 10, to allow for the aforementioned adjustment of said side pieces, and for the same purpose the brace 16 comprises two flat bars or members which are bolted to the inner sides of the side pieces, respectively, and overlap each other to receive a fastening bolt 18 passing through registering holes in said companion brace-members; and in order that the brace may be extensible and contractible for the purposes of the adjustment they are each provided with a series of holes 17 to receive the connecting-bolt. This triangular shaped frame is provided at its forward end with the usual form of clevis 12, and at its rear end with a pair of conventional handles 21, 21, the latter being bolted at their front ends to an intermediate portion of the side pieces and suitably braced by means of metal strips or standards 25 bolted to and rising from the rear extremities of said side pieces with a series of bolt holes at their upper ends for the connection of the handles and permit of vertical adjustment thereof.

By reference to Fig. 2 it will be noted that the rear ends of the side pieces 10 of the frame are flared outwardly from the points of connection of the brace 16, at 24, so as to conform to the disposition of the scraper-blades, hereinafter described, which are attached to said flared ends.

At a suitable distance from the front end of the frame I attach to the side pieces thereof a plurality of harrow teeth 19′ in two sets or groups at opposite sides of the longitudinal center of said frame, with the teeth of each set or group out of longitudinal line with each other so as to operate in different paths for breaking up the soil or surface crust at the sides of the growing plants; it being understood of course that the space between the sets or groups of teeth provides for non-interference with the plants, and that this space may be readily increased or diminished to suit different conditions or for cultivating a desired distance from the plants by adjusting the side pieces of the frame laterally in the manner hereinbefore set forth. For the purpose of disposing these harrow-teeth out of line with each other to a greater extent than provided for by the divergence of the side pieces those of each set are attached to the opposite sides of the respective side pieces, the attachment being made in the present instance by U-shaped clips 19. It will be noted that these harrow-teeth 19′ are each formed of a bar rectangular in cross-section with the lower end pointed and curved slightly forward, and that said teeth are disposed with an edge in front to more effectually break up or pulverize the soil.

Attached to the rear end of the frame so as to follow the harrow-teeth, and also located at opposite sides of the longitudinal center of the machine, are a pair of scraper-blades 27, attached to the rear ends of the side pieces 10 by uprights or standards 30 rising from the front ends of said blades and uprights or standards 26 rising from the rear ends thereof, the last mentioned standards being a continuation of the metal strips or standards 25 for bracing the handles and the first mentioned standards being extended above the aforesaid side pieces to receive brace-rods 29 which extend forwardly and are connected to the side pieces or frame by the bolts 20 attaching the handles thereto. The blades 27 are disposed obliquely to the line of draft and are each provided with a rearwardly extending wing 28 adapted to travel upon the surface of the bed to not only limit the cut of the blades in the soil but also steady the draft of the cultivator in a direct line and thereby facilitate the operation of the same. The scraper-blades operate beyond the paths of the harrow teeth, and it will be understood that they may be manipulated to scrape the surface of the bed for removing weeds or to cut into the soil and more thoroughly cultivate between the rows of plants.

Arranged in front of the scraper blades 27 and extending forwardly therefrom substantially in the line of draft of the cultivator are plates 23, attached to and depending from the side pieces 10 in a longitudinal direction and spaced apart corresponding with the adjustment of said side pieces with respect to each other; being attached by the bolts 20 connecting the handles 21 and brace-rods 29 to the side pieces; and in order that said plates may be adjusted to enter the soil to a more or less extent the bolts pass through a vertical slot 22 in each plate. The main purpose of these longitudinally disposed plates 23 is to cooperate with the wings 28 on the scraper blades 27 to steady the draft of the cultivator or assist the operator in guiding it over the row of plants, for it will be understood that the single animal required to draw the cultivator walks at one side of the row of plants and consequently there is a tendency to pull the cultivator to one side. This side shifting tendency is overcome by the operator guiding the cultivator, and in the present instance the longitudinal plates and wings on the scrapers by bearing in the soil materially reduces the effort required to keep the cultivator moving straight or in line with the row of plants. It will be understood, however, that the plates not only assist in directing the travel of the cultivator but are also an active element in the cultivation of the soil inasmuch as they break the top soil and loosen the earth about the plants to more thoroughly shape the bed for receiving moisture.

From the foregoing description it will be readily noted that the several implements of my improved cultivating machine all cooperate to work the soil in a peculiarly effective manner at both sides of a row of growing plants; for as the machine is drawn over the bed the harrow-teeth operate to gently break or pulverize the soil close up to the plants without disturbing their roots and the scraper-blades serve to remove weeds and further cultivate the soil beyond the path of said harrow-teeth, while the longitudinal plates help to guide the cultivator and work the soil at both sides of the plants; thus subjecting the bed to treatment that usually requires separate operations or more than one trip over the same. Furthermore, it will be noted that the construction of the machine is very light without sacrificing its stability and durability, and inasmuch as the frame itself and implements it carries are adjustable the utility of the cultivator is increased to the extent of permitting various treatments of a bed or garden, whereby it is particularly well adapted for cultivating and shaping beds of growing peanuts, cotton, and different kinds of vegetables, being not only susceptible of easy and economical operation but subjecting the bed or garden to a form of treatment that will materially enhance the growth of the plants.

I claim:—

1. In combination with a straddle-row cultivator having side pieces carrying scraper blades, of vertical plates suspended from the side pieces and disposed substantially in the line of draft to enter the soil at the sides of the plants and assist the operator in guiding the travel of the cultivator over the row of plants, and wings extending rearwardly from the scraper blades to travel over the bed and cooperate with the aforesaid plates in steadying the draft of the cultivator.

2. In combination with a straddle-row cultivator having side pieces carrying scraper blades, of vertical plates suspended from the side pieces and disposed substantially in the line of draft to enter the soil at the sides of the plants and assist the operator in guiding the travel of the cultivator over the row of plants, and means for adjusting said plates vertically with respect to the side pieces of the cultivator; together with wings extending rearwardly from the scraper blades to travel over the bed and cooperate with the aforesaid plates in guiding the cultivator, substantially as herein shown and described.

In testimony whereof, I affix my signature, in the presence of two witnesses.

JESSIE F. HARDEN.

Witnesses:
J. G. BRANTLEY,
E. M. TROUTHY.